Patented June 6, 1944

2,350,350

UNITED STATES PATENT OFFICE 2,350,350

GLYCOL FORMALS

William F. Gresham, Wilmington, Del., assignor to E. I. du Pont de Nemours & Company, Wilmington, Del., a corporation of Delaware No Drawing. Application May 6, 1941,
Serial No. 392,125

9 Claims. (Cl. 260—615)

This invention relates to a process for the preparation of oxygenated organic compounds and more particularly to such compounds obtained from vicinal glycols and aldehydes and the process of making them.

An object of the present invention is to provide new compositions of matter and processes for their preparation. Another object is to provide new compositions from vicinal glycols and aldehydes. Still another object is to provide a process for the interaction of ethylene glycol with formaldehyde in the presence of a suitable catalyst and for recovering new oxygenated organic compounds from the reaction product. Yet another object of the invention is to provide a process for the preparation of valuable products from ethylene glycol and formaldehyde. Other objects and advantages of the invention will hereinafter appear.

It has been found that high molecular weight oxygenated organic compounds can be obtained by reacting ethylene glycol with formaldehyde in the presence of a suitable catalyst. Generically, the reaction may be described as proceeding in accord with the equation:

1. 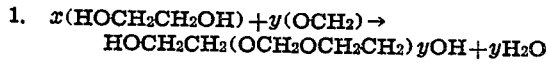

in which $x$ and $y$ are integers and $x$ is greater than $y$ by one. The product of the equation contains a linear ethenoxymethenoxy group with possible terminal hydroxy groups as indicated, although it is possible that the compounds do not have the configuration of the formula for there may be cross linkages and/or a plurality of ethylene oxide groups separated by one or more methylene oxide groups or a plurality of methylene oxide groups separated by one or more ethylene oxide groups.

More specifically, the invention may be illustrated by the reaction of one mole of formaldehyde with two moles of ethylene glycol in accord with the equation:

2. 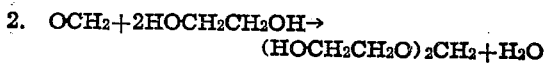

the product of which may be designated as di($\beta$-hydroxyethyl) formal.

Similarly from two moles of formaldehyde and three moles of ethylene glycol a product will be formed in accord with the equation:

3. 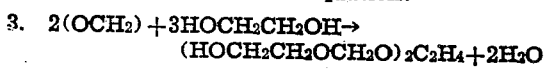

which may be called di-[$\beta$-(hydroxyethoxy)- methoxy]ethane, while from three moles of formaldehyde and four moles of ethylene glycol, di - [$\beta$-(hydroxyethoxy) methoxyethyl]formal is formed which is believed to have the formula:

4. 

It has been experimentally established that the products of Reactions 2 and 3 have the structure shown and there is good reason to believe that the formula for (4) is also correct. It is to be understood, however, they are so described by way of illustration and not by way of limitation. Much higher molecular weight products are likewise obtained up to a molecular weight of 1000 or more.

The above description is directed for simplicity to the reaction of ethylene glycol with formaldehyde, but this invention covers in addition to this reaction the reaction of vicinal glycols with aldehydes broadly. By vicinal glycol is meant a dihydric alcohol in which the hydroxyl groups are attached to adjacent carbon atoms. The vicinal glycols which may be employed other than ethylene glycol include, for example, 1,2-propylene glycol, 1,2-butylene glycol, 2,3-butylene glycol, and higher molecular weight vicinal glycols. The aldehydes other than formaldehyde which may be employed with the vicinal glycols include acetaldehyde, propanal, butanal, benzaldehyde, and the like.

The reaction is effected at temperatures ranging between —80° C. and 300° C., and preferably between 0 and 150° C. Atmospheric, sub- or superatmospheric pressures may be used, and if the last, pressures may range between 1 and 1000 atmospheres or higher although normally excellent results are obtained at about atmospheric pressure. If desired, the temperature of the reaction, especially when carried out at the boiling point of the reaction mixture, may be controlled by varying the pressure on the boiling reactants.

It has been found advantageous to effect the reaction in the presence of certain acidic type condensation catalysts, such, for example, as sulfuric acid, phosphoric acid; the halogen acids, e. g. hydrochloric acid, hydrofluoric acid (alone or with $BF_3$); boron fluoride (including its complexes with water, acids, esters, ethers, alcohols, and the like), paratoluene sulfonic acid, camphor sulfonic acid and other acid catalysts of this general nature. Friedel-Crafts type catalysts other than $BF_3$ may be used, such as $AlCl_3$, $AlBr_3$, $FeCl_3$ and so forth, as well as inorganic acids generally and their acid salts such as sodium acid sulfate, sodium acid phosphate and so forth.

The catalyst may be supported or not on inert supports such as charcoal, silica gel (which alone is a catalyst for the reaction), kieselguhr, and so forth. Concentrations of BF₃, H₂SO₄, and similarly strong acid catalysts may be extremely low; less than 0.1%, and amounts down to as low as 0.001% of the strong acid catalyst have been found sufficient to give polymers although high concentrations of the catalyst even equal to or greater than the weight of the ethylene glycol are likewise satisfactory.

The reaction is continued to approximate equilibrium in order to obtain the above.defined oxygenated organic compounds, or, if desired, reaction products are separated to force the reaction in the desired direction and until the molecular weight distribution wanted in the final product is attained. Normally the reaction of ethylene glycol and formaldehyde is continued for from 1.5 to 5 hours at temperatures between 50 and 150° C. and from 1 to 10 days at temperatures below 0° C., although greater or shorter reaction periods may be used (for the reaction of vicinal glycols, other than ethylene glycol, with the aldehyde a somewhat wider range of conditions may be employed); the reaction may then be stopped by destroying the catalyst. This may be done by removing it, (in the case of silica gel, kieselguhr, and the like) or by treating the reaction mixture with an inorganic base such as ammonia, alkali metal, and alkaline earth metal hydroxides, carbonates, alkoxides, and so forth, or an organic base such as as pyridine, dimethylamine, and the like. These bases are added in sufficient amounts to neutralize the catalyst and the unconverted reactants may be removed by distillation under reduced pressure. As soon as the catalyst has been neutralized, the reaction ceases. The neutralized catalyst may be filtered off and the polymerized product which remains treated for the recovery of the products. The products may be separated from the reaction mixture by careful fractionation, di(β-hydroxyethyl)formal, for example, distilling over at a temperature in the neighborhood of 108° C. at 1 mm. pressure; di(β-(hydroxyethoxy)methoxy)ethane at a temperature of 155° C. at 1 mm. pressure; di(β-(hydroxyethoxy)methoxyethyl)formal at a temperature of 205° C. at 1 mm. pressure, and the higher molecular weight products at somewhat higher temperatures at this pressure. After separating these lower molecular weight polymers, there remain higher molecular weight products in the residue which is generally a thick, viscous liquid.

The ratio of reactants inter alia influences the type polymers products obtained and it has been found that if ethylene glycol is employed in excess the formation of di(β-hydroxyethyl)formal is favored. Lower proportions of ethylene glycol and lower temperatures tend to give higher molecular weight compounds. Products of much higher molecular weight are produceable if the water formed as a result of the reaction is withdrawn as formed, which may be accomplished by the addition of a water withdrawing agent or by distillation under vacuum. Water may also be withdrawn intermittently, e. g. the reaction may be equilibrated, the water then extracted, removed by crystallization or other means, and the reaction then continued to equilibrium, the water again separated, and the cycle repeated until the desired molecular weight products are obtained.

In the reaction of vicinal glycols and formaldehydes and more especially ethylene glycol and formaldehyde to give high molecular weight products, there usually will be found in the reaction mixture along with unreacted glycol and formaldehyde, together with 1,3-dioxolane and products which it is not desired to produce. It is possible to inhibit the formation of the undesired products by carrying out the process in an intermittent or continuous manner whereby the desired product is withdrawn from the reaction zone and the undesirable products, after being separated therefrom, are returned to the reaction zone. By this means it is possible to obtain high yields of the desired product.

In addition to being instrumental in stopping the reaction at the desired point, the neutralization of the catalyst stabilizes the products. It follows, therefore, that for high temperature uses no acid should be present in the products as they should preferably be neutral or on the alkaline side.

Examples will now be given illustrating embodiments of the invention, but it will be understood that it will not be limited by the details thereof. Parts are by weight unless otherwise indicated.

*Example 1.*—A reaction mixture consisting of 310 parts of ethylene glycol, 30 parts of paraformaldehyde and 3 parts of sulfuric acid was heated on a steam bath under a reflux condenser for five hours. In approximately 20 minutes the paraformaldehyde dissolved yielding a colorless solution. Subsequent to neutralization of the catalyst with a methanol solution of sodium methoxide, the reaction product was fractionally distilled under reduced pressure. Unconverted glycol amounted to 208.7 parts. Di(β-hydroxyethyl)formal, $CH_2OCH_2CH_2OH)_2$, distilled at 124.5–128° at 4 mm., 51.5 parts. There likewise was separated, by steam distillation and fractionation under a lower pressure appreciable amounts of di-[β-(hydroxyethoxy)methoxy]-ethane which has the following properties:

B. P.—155–156° C. at 1 mm.
Refractive index at 25° C.—1.4510
Density at 25° C.—1.160
Miscible with water, benzene, and methanol and di-[β-(hydroxyethoxy)methoxyethyl]formal having the following properties:

B. P.—205° C. at 1 mm.
Refractive index at 25° C.—1.4542
Density at 25° C.—1.165
Miscible with water, benzene, and methanol

*Example 2*

Charge: Parts
Ethylene glycol _____ 79.9
Paraformaldehyde _____ 7.6
95% sulfuric acid _____ 0.13

The above charge containing approximately a 5 to 1 molar ratio of glycol to formaldehyde and the weighed sulfuric acid which equalled approximately 0.15% of the reactants was charged into a still pot. The still equipment was constructed of stainless steel and the pot jacket heated with a liquid, heat transfer medium.

The charge was heated at atmospheric pressure to between 80 and 90° C. under total reflux for four hours and then cooled. Sodium methoxide (approximately 28.0% in methanol) was added equivalent to the original sulfuric acid plus an excess of approximately 5% by volume. The still was then operated under 20 mm. reduced pressure and the methanol, 1,3-dioxolane, and unreacted glycol removed as foreshots to 145° C. 10.9 parts of di(β-hydroxyethyl)formal was recovered.

*Example 3.*—A reaction mixture consisting of 380 parts of 1,2-propylene glycol, 30 parts of paraformaldehyde and 8.4 parts of sulfuric acid was processed 14 hours at 30–35° C. and ca. 1 mm. pressure. The catalyst was destroyed by addition of 7 parts of sodium hydroxide dissolved in 15 parts of water. Fractional distillation of the product gave 31 parts of the linear formal, B. P. 94–96° C. at ca. 1 mm. Hydroxyl No. 680; calculated for $C_7H_{16}O_4$, 683; refractive index at 25° C., 1.4420; density at 25° C., 1.072. This product contains a compound or compounds having the structural formulas:

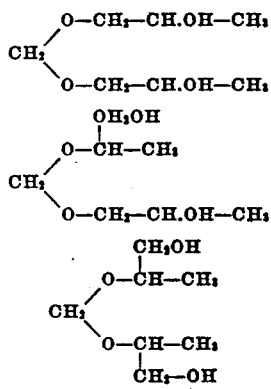

The compounds prepared in accord with the invention may be employed for a large number of uses. The high molecular weight products which are soluble in water are suitable as additions to various baths for the treatment of natural and synthetic textiles. For example, they may be employed in washing, dyeing, aftertreating, mercerizing, carbonizing, fulling, wetting, dispersing, emulsifying, and levelling operations, and furthermore, for improving the fastness of dyeings to rubbing. These products may likewise be used as solvents and as assistants for converting dyestuffs into pastes and as emulsifying agents, for instance, for dispersing oils, fats, and hydrocarbons.

The products dissolved or dispersed in water likewise have desirable properties so that they may be employed in such form in the textile, leather, paper, wax, and polish industries as, for example, in coating, mercerizing, dressing, bucking, finishing, printing or polishing, in the formation of carbon paper and belt dressings. They are likewise suitable for use in dyeing and printing because of their spreading, levelling, binding action; for example, with vat dyestuffs, or with azo dyestuffs from β-naphthoic acid arylides on the fibre, the dyeings are rendered by their use more uniform and fast to rubbing. For similar purposes they may be used with pigments and paints as well as being useful as a protective film and dispersing agent for ceramic colors and as a bodying agent and solvent in printing oils.

Products which are sufficiently soluble in lipoids, may be employed in preparations for oiling, sizing or finishing and as softening agents for textiles and also in the production of salves, cosmetic and pharmaceutical preparations, greasing agents, stuffing agents, fat thickening agents, cutting or boring oils, polishing masses, agents for protecting the surface of metals from corrosion as well as additions to lacquers, varnishes, and paints.

The products may be used as preservatives and plasticizers for synthetic and natural rubber, caoutchouc and the like which may or may not be vulcanized and may also be employed as an antisqueak fluid with or without graphite.

They can be used alone or in mixture with materials having known cleaning, wetting and dispersing powers which otherwise serve to bring the products into a form specifically desired for use. As such addition agents may be mentioned by way of example, soaps, Turkey red oils, mineral oils and fatty alcohol sulphonates, alkylated naphthalene-sulphonic acids, glue, gelatine, casein, sulphite cellulose waste liquor, water-soluble gums, mucilages, alcohols, ketones, hydrocarbons, halogenated hydrocarbons or mixtures of these substances. They may be used in dressing and sizing of natural yarns such as cotton, wool, silk, etc., and the synthetic yarns such as cellulose acetate, polyamide, casein, regenerated cellulose, etc. The products of the invention may likewise be found to be applicable for use in shrink-proofing of wool to improve the appearance and feel of the product.

The products and more particularly the high molecular weight products are suitable as plasticizers, elasticizers and softening agents for the addition to regenerated cellulose, the cellulose esters, such as cellulose formate, cellulose acetate, cellulose nitrate, cellulose acetonitrate, cellulose acetopropionate, cellulose butyroacetate and similar mixed esters of cellulose including the water sensitive cellulose derivatives, such as prior or subsequent to film and filament formation. The products are likewise applicable in substantially the same capacity for addition to the relatively water-insoluble cellulose ethers, such as ethyl cellulose and methyl cellulose. They likewise may be added to the synthetic resins, such, for example, as the esters of acrylic and methacrylic acid and their derivatives and more especially the monomers and polymers of methyl methacrylate, methacrylonitrile, acrylonitrile, methyl acrylate and the other monomeric and polymeric esters and derivatives of acrylic and α substituted acrylic acids; the monomeric and polymeric vinyl resins such as vinyl alcohol, vinyl acetate, vinyl chloride, vinyl chloracetate, styrene, the polymerized olefines, polymeric ethylene oxides, and polymeric compounds generally.

The products may likewise be used as water-soluble lubricants for rubber molds, textile fibers, and in metal forming operations, and as a lubricant and coolant in cutting, drilling, and machining operations.

The products generally may be used advantageously as plasticizers or softeners for use in materials such as casein, glue, gelatine, cork, printing inks, water-soluble art crayons, shoe dressings (white or colored), water paints, paper coatings, kalsomine, plaster and sizing materials, and hair dressings for permanent waves.

The products of the invention may likewise be found to be useful as addition agents for preparing oil well drilling muds, for modifying natural and synthetic waxes, dispersing agents and ingredients for fungicides, insecticides, sprays, etc., as a scrubbing liquid in air purification, a heat transfer medium, an assistant in textile spinning baths, an assistant for twist setting of yarns, an agent for crease and crinkleproofing, as a coating composition for making oil resistant fabrics, for delustering synthetic yarns, greaseproofing of paper, humectant for addition to tobacco, and so forth, as in aid in grinding cement clinker and as a binder for abrasives.

I claim:

1. A process for the preparation of products having the structural formula (HOCH$_2$CH$_2$)(OCH$_2$OCH$_2$CH$_2$)$_x$
(OCH$_2$OCH$_2$CH$_2$OH)

in which $x$ is a positive integer from 1 to 2, which comprises reacting ethylene glycol with formaldehyde in the presence of a strong acid catalyst, neutralizing the catalyst with a base, and subsequently separating the products from the reaction mixture.

2. A process for the preparation of di[β-(hydroxyethoxy)methoxy]ethane which comprises reacting 310 parts of ethylene glycol with 30 parts by weight of formaldehyde in the presence of 3 parts by weight of sulfuric acid under reflux temperatures, neutralizing the catalyst with a methanol solution of sodium methoxide, and recovering the di[β-(hydroxyethoxy)methoxy]ethane from the reaction product by distillation.

3. The process of claim 1 conducted at a temperature between 0 and 150° C.

4. The process of claim 1 conducted with sulfuric acid as the catalyst.

5. The process of claim 1 conducted with boron fluoride as the catalyst.

6. In a process for the preparation of di[β-(hydroxyethoxy)methoxy]ethane, the steps which comprise reacting ethylene glycol with formaldehyde in the presence of a strong acid catalyst, neutralizing the catalyst with a base and after stripping of di(β-hydroxyethyl)formal by low pressure distillation, recovering the di[β-(hydroxyethoxy)methoxy]ethane from the residue.

7. An ethylene glycol-formaldehyde reaction product having the formula (HOCH$_2$CH$_2$)(OCH$_2$OCH$_2$CH$_2$)$_x$
(OCH$_2$OCH$_2$CH$_2$OH)

in which $x$ is a positive integer from 1 to 2.

8. Di-[β-(hydroxyethoxy)methoxy]ethane having a boiling point between 155 and 156° C. at 1 mm.

9. Di-[β-(hydroxyethoxy)methoxyethyl]formal having a boiling point of approximately 205° C. at 1 mm.

WILLIAM F. GRESHAM.

CERTIFICATE OF CORRECTION.

Patent No. 2,350,350. June 6, 1944.

WILLIAM F. GRESHAM.

It is hereby certified that error appears in the printed specification of the above numbered patent requiring correction as follows: Page 2, first column, line 60, after the word "type" strike out "polymers"; and second column, line 41, for "CH$_2$OCH$_2$CH$_2$OH)$_2$" read -- CH$_2$(OCH$_2$CH$_2$OH)$_2$ --; and that the said Letters Patent should be read with this correction therein that the same may conform to the record of the case in the Patent Office.

Signed and sealed this 8th day of August, A. D. 1944.

(Seal)

Leslie Frazer
Acting Commissioner of Patents.